US010683747B2

(12) United States Patent
Ranjan et al.

(10) Patent No.: US 10,683,747 B2
(45) Date of Patent: Jun. 16, 2020

(54) DIRECTIONAL MONITORING OF INJECTION FLOOD FRONTS

(71) Applicant: Halliburton Energy Services, Inc., Houston, TX (US)

(72) Inventors: Priyesh Ranjan, Houston, TX (US); Burkay Donderici, Pittsford, NY (US); Ahmed Elsayed Fouda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 85 days.

(21) Appl. No.: 15/767,726

(22) PCT Filed: Dec. 31, 2015

(86) PCT No.: PCT/US2015/068260
§ 371 (c)(1),
(2) Date: Apr. 12, 2018

(87) PCT Pub. No.: WO2017/116461
PCT Pub. Date: Jul. 6, 2017

(65) Prior Publication Data
US 2018/0283168 A1     Oct. 4, 2018

(51) Int. Cl.
*E21B 47/10*     (2012.01)
*G01V 3/26*     (2006.01)
(Continued)

(52) U.S. Cl.
CPC .......... *E21B 47/102* (2013.01); *E21B 43/162* (2013.01); *E21B 43/20* (2013.01);
(Continued)

(58) Field of Classification Search
CPC ............ G01V 3/26; G01V 3/18; E21B 47/00
See application file for complete search history.

(56) References Cited

U.S. PATENT DOCUMENTS

| 2009/0288881 A1* | 11/2009 | Mullins | ..................... E21B 7/04 |
| | | | 175/50 |
| 2009/0299637 A1* | 12/2009 | Dasgupta | ............... G01V 1/288 |
| | | | 702/12 |

(Continued)

OTHER PUBLICATIONS

PCT Application Serial No. PCT/US2015/068260, International Search Report, dated Aug. 24, 2016, 3 pages.

(Continued)

*Primary Examiner* — Alvaro E Fortich
(74) *Attorney, Agent, or Firm* — Gilliam IP PLLC

(57) ABSTRACT

A system includes a set of one or more electromagnetic (EM) field sensors deployed in a borehole formed in a downhole formation, wherein the set of EM field sensors provides sensitivity to EM fields. The system also includes an EM field source that emits an EM field into the downhole formation. The system also includes a data processing system that receives measurements collected by the set of EM field sensors in response to the emitted EM field. The data processing system models the subsurface EM field based on the received measurements and identifies a plurality of flood fronts corresponding to fluid approaching the borehole from the injection wells, and adjusts injection rates to prevent injection fluid breakthrough.

20 Claims, 12 Drawing Sheets

(51) Int. Cl.
  *G01V 3/18*  (2006.01)
  *E21B 47/00*  (2012.01)
  *E21B 43/16*  (2006.01)
  *E21B 43/20*  (2006.01)
  *G01V 8/16*  (2006.01)

(52) U.S. Cl.
  CPC .......... *E21B 47/00* (2013.01); *E21B 47/1025* (2013.01); *G01V 3/18* (2013.01); *G01V 3/26* (2013.01); *G01V 8/16* (2013.01)

(56) References Cited

U.S. PATENT DOCUMENTS

| | | |
|---|---|---|
| 2012/0016649 A1 | 1/2012 | Thambynayagam et al. |
| 2012/0158310 A1* | 6/2012 | Adams .................... E21B 47/06 702/13 |
| 2012/0192640 A1* | 8/2012 | Minh ........................ E21B 7/06 73/152.16 |
| 2014/0191120 A1* | 7/2014 | Donderici ............. E21B 47/123 250/265 |
| 2016/0003962 A1* | 1/2016 | Sena ........................ G01V 3/28 324/339 |
| 2018/0174247 A1* | 6/2018 | Rodríguez Torrado ..................... G06Q 10/04 |

OTHER PUBLICATIONS

PCT Application Serial No. PCT/US2015/068260, International Written Opinion, dated Aug. 24, 2016, 11 pages.

* cited by examiner

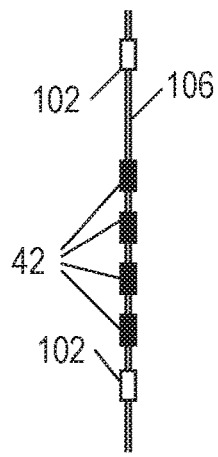
FIG. 3
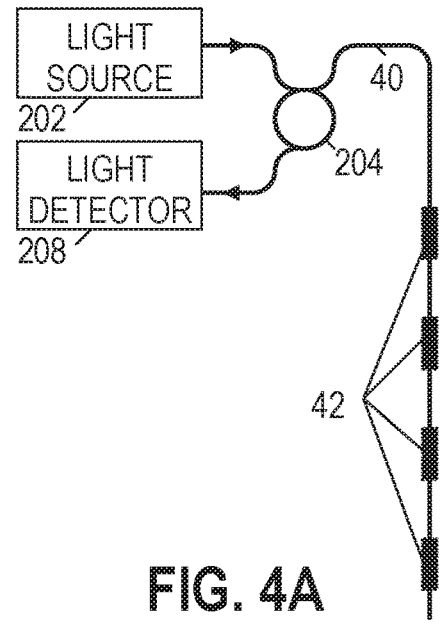
FIG. 4A
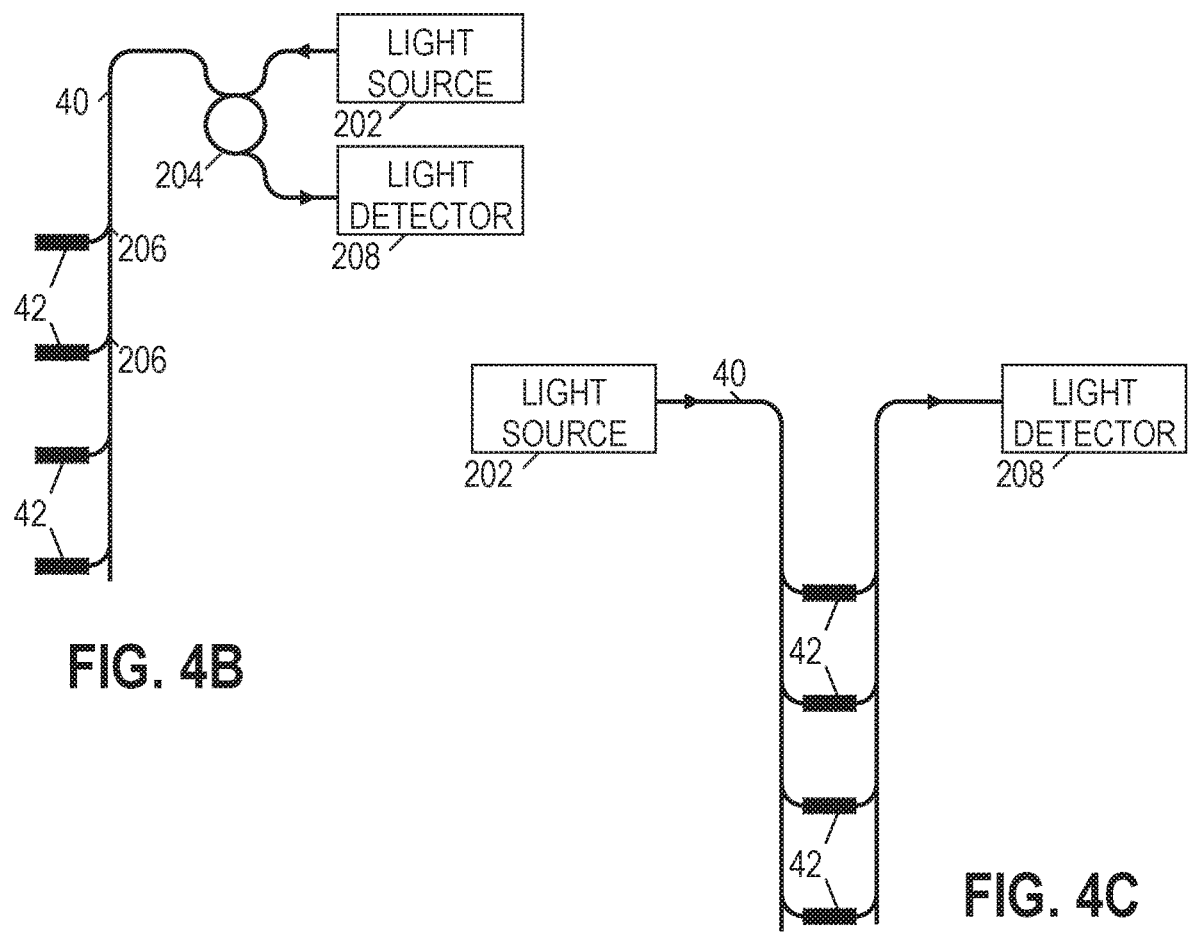
FIG. 4B
FIG. 4C

DIRECTIONAL MONITORING OF INJECTION FLOOD FRONTS

BACKGROUND

Oil field operators drill boreholes into subsurface reservoirs to recover oil and other hydrocarbons. If the reservoir has been partially drained or if the oil is particularly viscous, the oil field operators will often stimulate the reservoir, e.g., by injecting water or other fluids into the reservoir via secondary wells to encourage the oil to move to the primary ("production") wells and thence to the surface. Other stimulation treatments include fracturing (creating fractures in the subsurface formation to promote fluid flow) and acidizing (enlarging pores in the formation to promote fluid flow).

The stimulation processes can be tailored with varying fluid mixtures, flow rates/pressures, and injection sites, but may nevertheless be difficult to control due to inhomogeneity in the structure of the subsurface formations. The production process for the desired hydrocarbons also has various parameters that can be tailored to maximize well profitability or some other measure of efficiency. Without sufficiently detailed information regarding the effects of stimulation processes on a given reservoir and the availability and source of fluid flows for particular production zones, the operator is sure to miss many opportunities for increased hydrocarbon recovery.

BRIEF DESCRIPTION OF THE DRAWINGS

Accordingly, there are disclosed herein methods and systems to identify a plurality of flood fronts at different azimuthal positions relative to a borehole. In the drawings:

FIG. 3 is a diagram showing another electric field sensing option.

FIGS. 4A-4C are diagrams showing illustrative optical multiplexing architectures for distributed electric field sensing.

Figure 1:
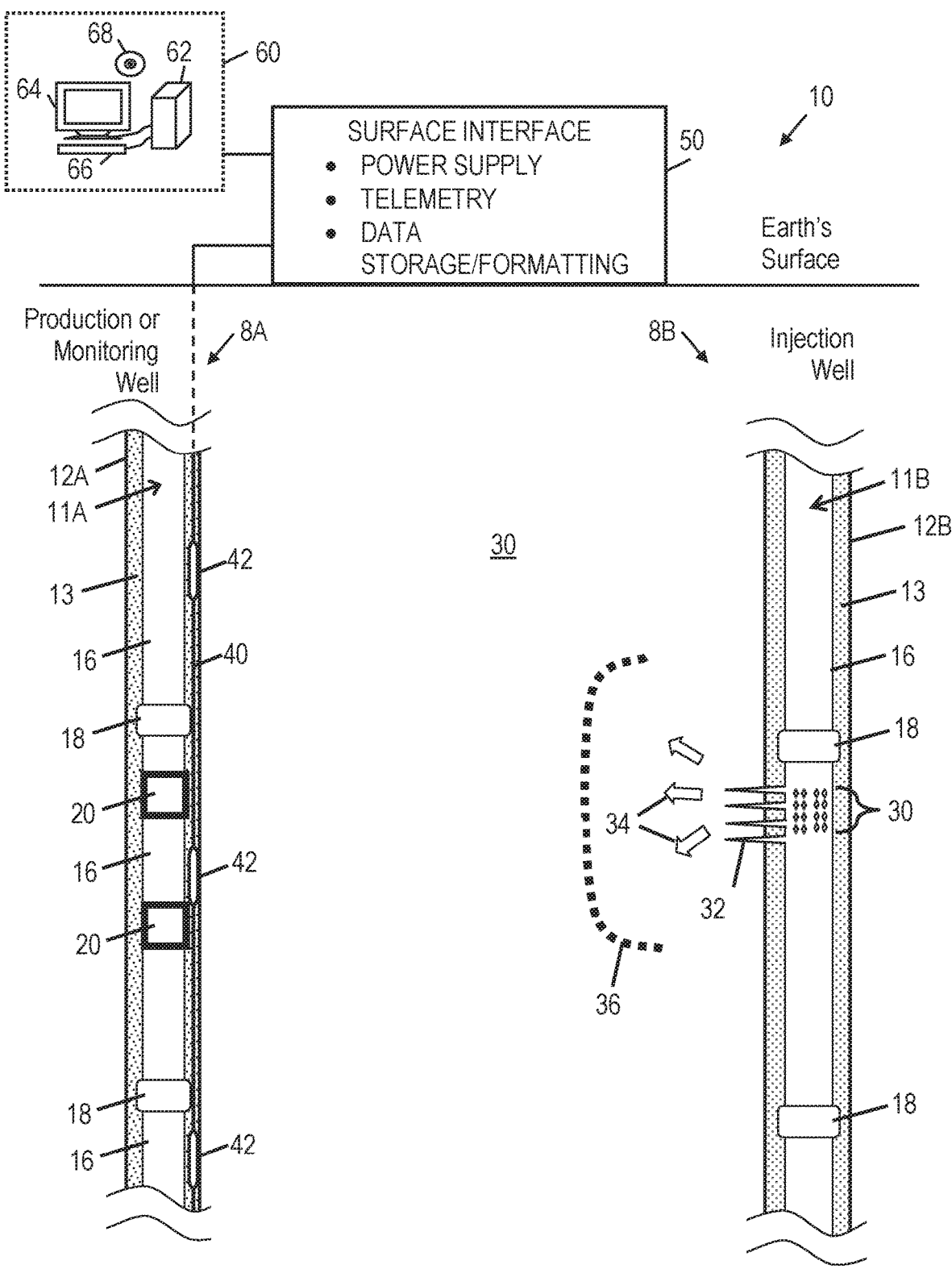
FIG. 1 is a diagram showing an illustrative environment for subsurface electromagnetic (EM) field monitoring.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

Disclosed herein are methods and systems to identify a plurality of flood fronts at different azimuthal positions relative to a borehole. The disclosed methods and systems involve a set of one or more electromagnetic (EM) field sensors deployed in a downhole formation. For example, the set of EM field sensors may correspond to electric field sensors or magnetic field sensors deployed external to a casing in a borehole. In different embodiments, the EM field sensors may be attached to a casing segment, a centralizer, an insulated pad, a swellable packer, or another component external to a casing. Further, each EM field sensor may be omni-directional or directional. In at least some embodiments, measurements are collected by the set of one or more EM field sensors in response to an EM field provided in the downhole formation. Different options for providing an EM field are possible. For example, the EM field can be provided by emitting current into the downhole formation at one or more points along a casing string and/or at one or more points along an electrical conductor deployed in a borehole. Further, in some embodiments, inductive loops may be deployed downhole to generate an EM field in the downhole formation. In at least some embodiments, one or more optical fibers convey measurements collected by the set of EM field sensors to earth's surface. Different electro-optical transducers, data modulation (e.g., optical phase or intensity modulation), and multiplexing options are available. At earth's surface, the optical signals are converted back to electrical signals and are processed to analyze the subsurface EM field monitored by the EM field sensors. As described herein, the obtained EM field measurements can be applied to a reservoir model to identify a plurality of flood fronts at different azimuthal position relative to a borehole (e.g., the borehole in which the set of EM field sensors are deployed). Position information of identified flood fronts or a representation of identified flood fronts can be presented to a user via a computer display (e.g., by displaying coordinate positions or by visualization of any flood front).

In at least some embodiments, the set of EM field sensors are used to perform a multi-stage test, where EM field activity is monitored (e.g., using the set of EM field sensors and an EM field source) as injection rates of different injection wells are varied (i.e., a controlled injection process). The multi-stage test facilitates analysis of how the output of different injection wells affects related flood fronts. The results of the multi-stage test can be used to update the reservoir model to increase the accuracy of EM field measurement interpretation. In this manner, the accuracy of identifying a plurality of flood fronts at different azimuthal positions relative to a borehole can be improved.

In at least some embodiments, an example system includes a set of one or more EM field sensors deployed in a borehole formed in a downhole formation, where the set of EM field sensors provides directional sensitivity to EM fields. The system also includes an EM field source that emits an EM field into the downhole formation. The system also includes a data processing system that receives measurements collected by the set of EM field sensors in response to the emitted EM field. The data processing system applies the received measurements to a reservoir model to identify a plurality of flood fronts at different azimuthal positions relative to the borehole.

Meanwhile, a related method includes deploying a set of one or more EM field sensors in a borehole formed in a downhole formation. The method also includes providing an EM field in the downhole formation and receiving measurements collected by the set of EM field sensors in response to EM field. The method also includes applying the received measurements to a reservoir model to identify a plurality of flood fronts at different azimuthal positions relative to the borehole. Various EM field sensor options, EM field source options, and measurement analysis options are disclosed herein.

Turning now to the drawings, FIG. 1 shows an illustrative environment 10 for subsurface EM field monitoring. In environment 10, a production well or monitoring well 8A is represented as a borehole 12A with a casing string 11A having a plurality of casing segments 16 joined by collars 18. If the well 8A is a production well, the casing string 11A may include one or more sets of perforations, filters, and/or controllable flow zones (not shown). Further, cement 13 may fill at least some of the annular space between the casing string 11A and the wall of borehole 12A. The cement 13 may have the same EM properties (e.g., resistivity, permeability, etc.) or different EM properties as the surrounding formation. In either case, the EM properties of the cement 13 may be accounted for when interpreting measurements collected by EM field sensor units 42 in response to EM fields emitted by one or more EM field sources 20.

In FIG. 1, the EM field sensors units 42 are positioned in the annular space between the casing string 11A and the wall of borehole 12A (i.e., in the same area as cement 13). In at least some embodiments, the EM field sensor units 42 are coupled to a fiber-optic cable 40 to convey collected measurements to earth's surface. The fiber-optic cable 40 and the EM field sensors units 42 may be deployed downhole, for example, by attaching the cable 40 and the EM field sensors units 42 to the exterior of different casing segments 16 as these casing segments are joined to form the casing string 11A and are lowered into the borehole 12A.

In FIG. 1, the EM field sensors units 42 are represented as being positioned to one side of the casing string 11A. In alternative embodiments, such EM field sensor units 42 may be positioned on different sides of the casing string 11A, or may be azimuthally distributed around one more sensor depths along the casing string 11A. Other sensor groupings or arrangements are possible, where fewer EM field sensor units 42 or additional EM field sensor units 42 are used. Further, each EM field sensor units 42 may include one sensor or a plurality of sensors. In different embodiments, the EM field sensor units 42 may include electric field sensors or magnetic field sensors that are directional or omni-directional.

In at least some embodiments, EM field sensor units 42 include one or more EM field sensors within a housing that resists high pressure, high temperature, and corrosion. Further, the housing should allow transmission of electric or magnetic fields without undue attenuation. The EM field sensor units 42 may be connected to a fiber-optic tubing encapsulated cable (TEC), and clamped to the casing string 11A as it is being deployed. Without limitation, example housing materials include Inconel and BeCu. In alternative embodiments, EM sensors deployed along the casing string 11A have no housing (e.g., electrodes). In such case, insulated conductors may connect each EM sensor to one or more transducer modules coupled to the fiber-optic cable 40. Each transducer module may include one or more electro-optical transducers, resulting in sensor measurements being converted from electrical signals to optical signals, which can then be conveyed to earth's surface via the fiber-optic cable 40.

During EM field monitoring, the injection well 8B may be injecting water into the downhole formation 30 to direct hydrocarbons towards well 8A. The injection well 8B is represented as a borehole 12B with a casing string 11B having a plurality of casing segments 16 joined by collars 18. Cement 13 may fill the annular space between the casing string 11B and the wall of the borehole 12B. Along the casing string 11B, one or more sets of perforations 30 and 32 enable water 34 to leave the casing string 11B and enter the downhole formation 30, resulting in a waterfront 36 that moves towards well 8A over time. The EM field monitoring options described herein can be used to track a flood front such as waterfront 36.

Figure 2A:
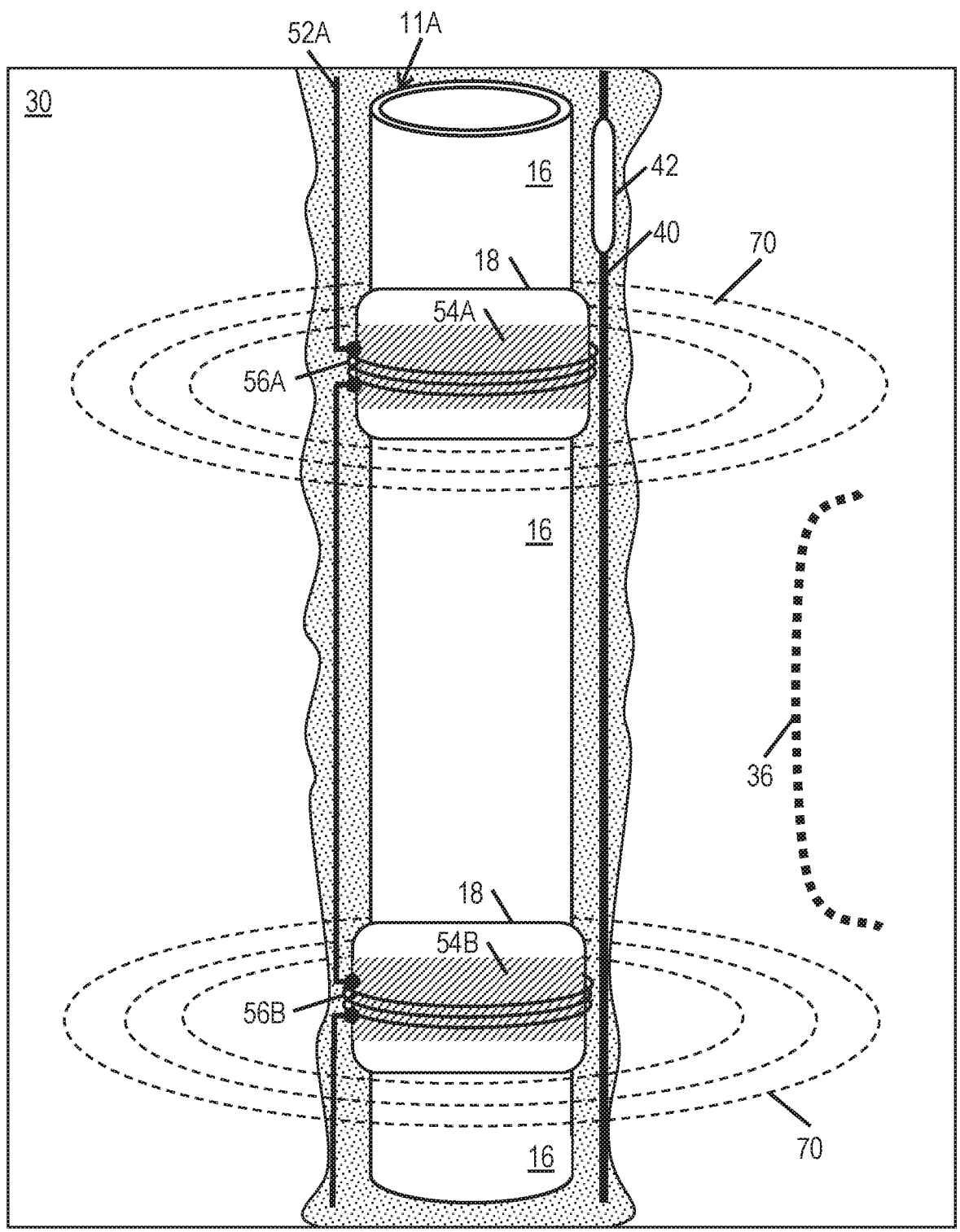
FIGS. 2A-2C are diagrams showing different subsurface EM field monitoring system configurations.
Figure 2B:
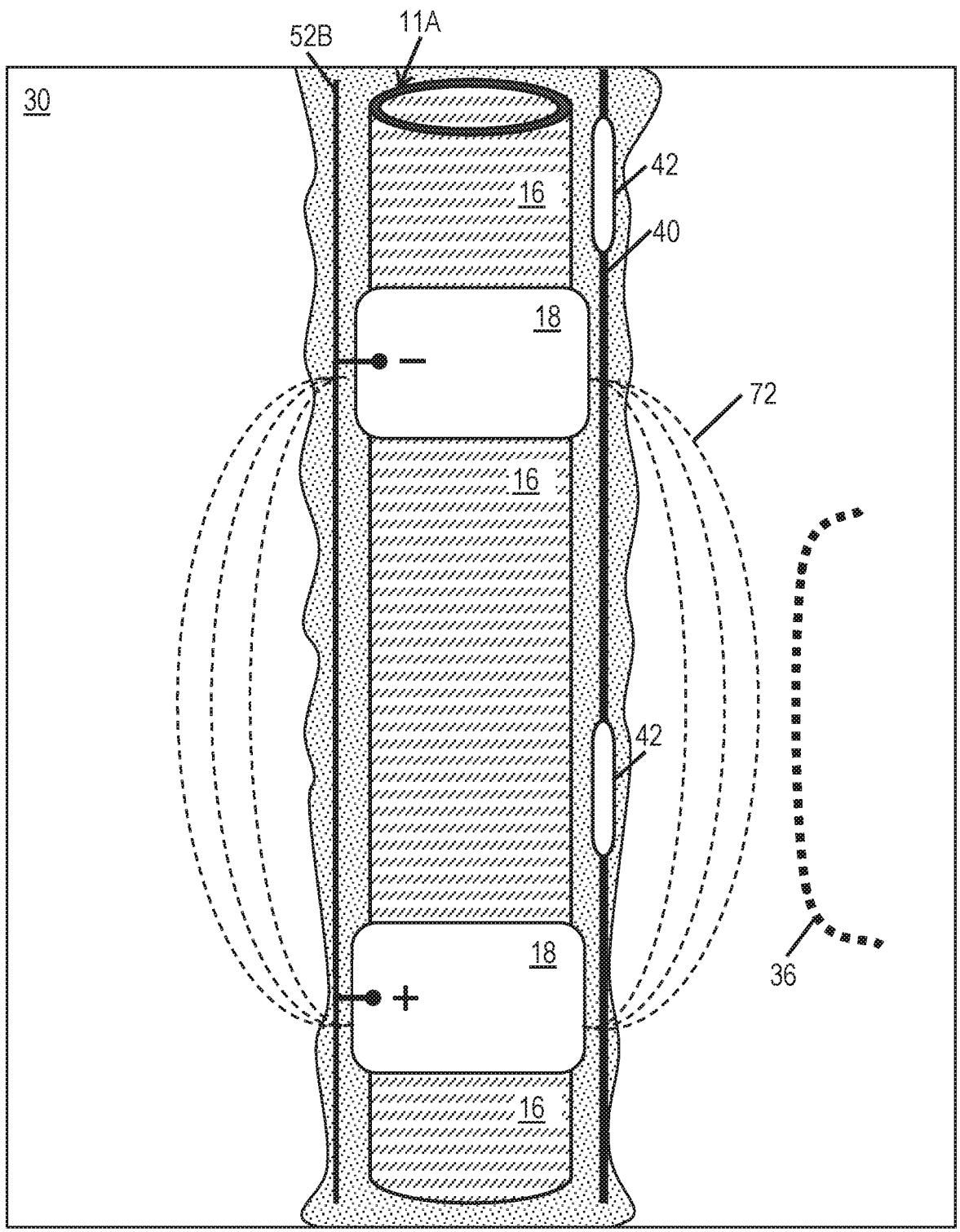
Figure 2C:
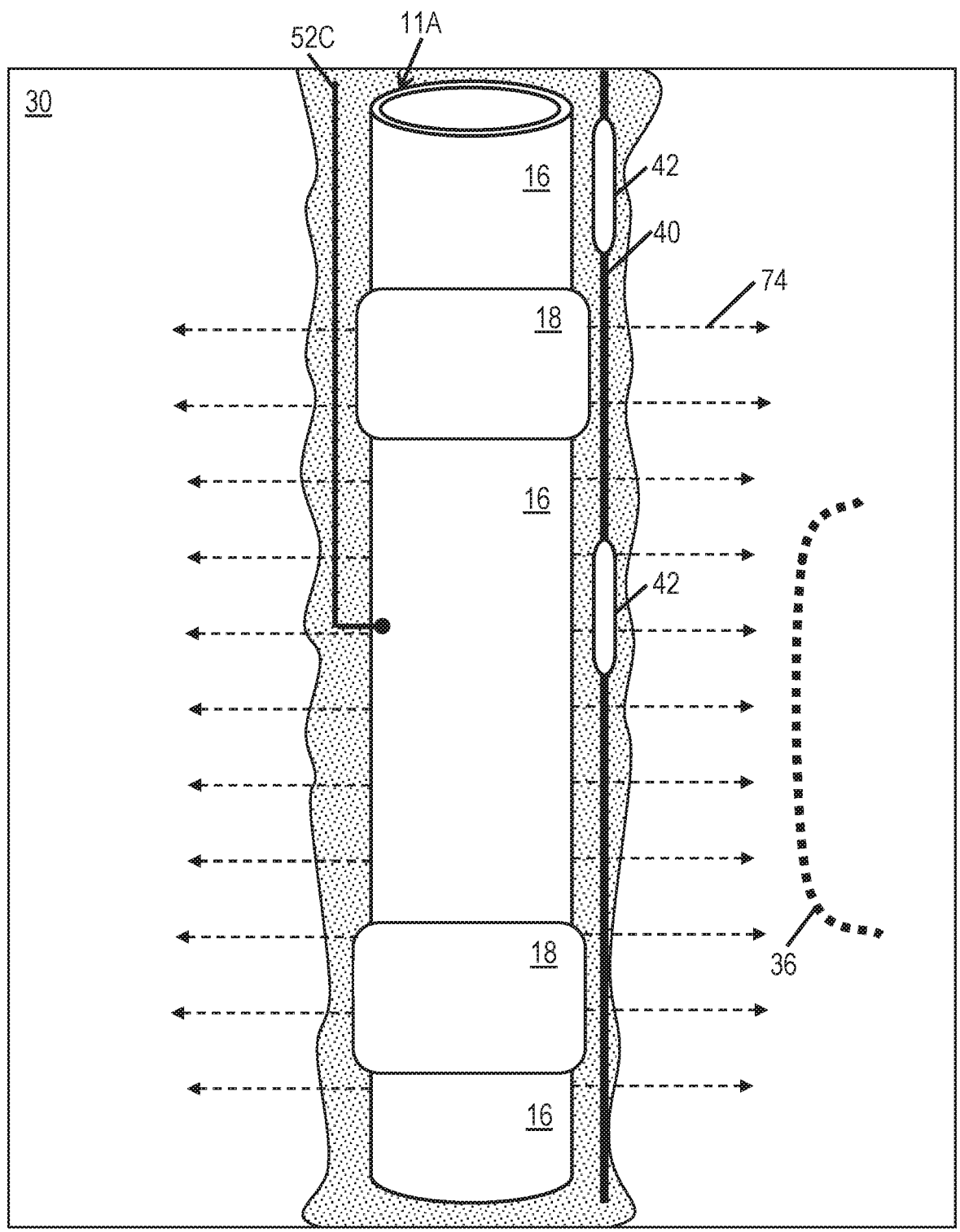

FIGS. 2A-2C show different subsurface EM field monitoring system configurations that may be used to track waterfront 36. In FIG. 2A, a magnetic field monitoring system is represented. For the configuration of FIG. 2A, coils 56A and 56B are connected in series to a power supply or signal generator by an insulated conductor 52A. For example, the coils 56A and 56B may be wrapped around respective collars 18. As desired, ferrite sleeves 54A and 54B can be used to improve the magnetic dipole moment 70 generated by electrical current passing through the coils 56A and 56B. For the configuration of FIG. 2A, each EM field sensor unit 42 may include one or more magnetic field sensors, where the measured magnetic field is a function of the conductivity of the downhole formation 30, which is altered by the approaching waterfront 36.

In different embodiments, EM field sensor units 42 are arbitrarily spaced along the fiber-optical cable 40 depending on the length of the monitoring zone and the desired vertical resolution. Depending on the formation, a typical axial spacing between EM field sensor units 42 is around 15 to 30 ft. Meanwhile, the source EM field frequency for the configuration of FIG. 2A may range from 0.1 to 10 kHz. Lower frequencies are used with longer EM source/sensor spacing (for deep sensitivity) and higher frequencies are used with shorter EM source/sensor spacing (for shallow sensitivity).

Example magnetic field sensors include one or more coils coupled to an electro-optical transducer. As another example, magnetic field sensors may include a magnetostrictive material bonded to an optical fiber of the fiber-optic cable 40. Examples of magnetostrictive materials include cobalt, nickel, and iron metals and their alloys, e.g., metglass and Terfenol-D. As the magnetostrictive material deforms due to the incident magnetic field, it induces strain in the optical fiber bonded to it. The strain in the fiber can be interrogated and correlated with magnetic field strength and direction. As an example, the strain may be linearly proportional to the magnetic field detected. With optical sensing options, electrical multiplexing circuitry downhole can be avoided. As desired, signals from multiple EM field sensor units 42 (at different axial positions along the casing string 11A) can be communicated over the fiber-optic cable 40 using known fiber-optic multiplexing and interrogation techniques.

In an alternative embodiment, magnetic field monitoring may be performed by pick-up coils that are used to convert the magnetic field into a potential difference that is applied to an electro-mechanical transducer. As the electro-mechanical transducer deforms due to the applied potential, it induces strain in the optical fiber bonded to it. In another embodiment, an electronic switching circuit can be used to multiplex signals from different magnetic field sensors (pick-up coils) to an electrical or fiber-optic cable that delivers the measurements uphole.

In FIG. 2B, an electric field monitoring system is represented, where electric bipoles along casing string 11A are used as transmitters. For example, at least some casing segments 16 of the casing string 11A may be insulated from respective collars 18, which are used as electrodes. In the example of FIG. 2B, axially-spaced collars 18 are at different electrical potentials by connection to different conductors of an insulated cable 52B. The result of these collars 18 being at different potentials is a current being emitted from one collar 18 (electrode) and returning to the other collar 18 (electrode), thus forming an electric bipole field 72. The axial component of the electric bipole field 72 may be measured using EM field sensor units 42. This measurement is sensitive to the resistivity of the formation subtended by the electric bipole field 72, and therefore can be used to detect changes in resistivity of the downhole formation 30 due to the approaching waterfront 36.

In FIG. 2C, an electric field monitoring system is represented, where at least part of the casing string 11A is used as a current injection electrode. For example, the casing string 11A may be coupled to an insulated cable 52C at a wellhead and/or at one or more points along the casing string 11A. For the configuration of FIG. 2C, the return electrode is deployed far away from the casing such that current flows radially from the casing string 11A towards the return electrode. The radial component of the resulting electric field 74 is measured using EM field sensor units 42. This measurement is sensitive to the resistivity of the formation layer aligned with the sensor, and therefore can be used to detect changes in resistivity due to an approaching waterfront 36.

For the configurations of FIGS. 2B and 2C, example electric field sensors include one or more electrodes coupled to respective electro-optical transducers. Such electrodes can be galvanic or capacitive. Capacitive electrodes have stable contact resistance and are less vulnerable to corrosion. Example electro-optical transducers include piezoelectric transducers to apply strain to an optical fiber as a function of an electric field measurement, transducers to move reflectors or optical cavities as a function of an electric field measurement, or light-emitting diodes (LEDs) to emit light as a function of an electric field measurement. In other embodiments, electric field sensors may correspond to an electrostrictive material bonded to an optical fiber of the fiber-optic cable 40. As the electrostrictive material deforms due to the incident electric field, it induces strain in the optical fiber bonded to it. The strain in the fiber can be interrogated and correlated with electric field strength and direction. As an example, the strain may be linearly proportional to the electric field detected. With optical sensing options, electrical multiplexing circuitry downhole can be avoided. As desired, signals from multiple EM field sensor units 42 (at different axial positions along the casing string 11A) can be communicated over same fiber-optic cable 40 using known fiber-optic multiplexing and interrogation techniques.

For the configurations of FIGS. 2A-2C, azimuthally-sensitive measurements may be collected at one or more axial positions. Such measurements may be obtained using omni-directional sensors and/or by azimuthally distributing EM field sensor units 42 at one or more axial positions along the casing string 11A (see e.g., FIGS. 2A-2C). For example, in some embodiments, at least five azimuthal measurements per axial position may be collected to uniquely determine the azimuthal direction of changes in formation resistivity.

As desired, insulating pads may be used to electrically insulate EM field sensor units 42 or individual sensors from the casing string 11A. In other embodiments, EM field sensor units 42 or individual sensors may be mounted to insulating centralizers or insulating swellable packers. For the configurations of FIGS. 2A-2C, a power supply at earth's surface (e.g., part of the surface interface 50) provides current to the respective EM field sources (e.g., to coils 56A and 56B in FIG. 2A, to collars 18 in FIG. 2B, or to the casing string 11A in FIG. 2C). The power and measurement conveyance described in FIGS. 2A-2C are examples only. Other options involving a downhole power source are possible. Further, current may be injected into the downhole formation 30 without using casing segments 16 or collars 18 as current conductors.

FIG. 3 is a diagram showing another EM field sensing configuration, where an umbilical 106 combines conveyance of electrical power with conveyance of electrical or optical signals. The umbilical 106, for example, includes one or more electrical conductors and one or more optical fibers. With the umbilical 106, a separate fiber-optic cable (e.g., fiber-optic cable 40) can be omitted. Further, the umbilical 106 can be used to operate electrodes or antennas for generating EM fields in addition to or instead of other EM field source options. For example, FIG. 3 shows two electrodes 102 along the umbilical 106, where a voltage generated between the two electrodes 102 creates an electric dipole radiation pattern. The measurements collected by EM field sensor units 42 in response to the radiated pattern can be used to derive formation parameters from which flood fronts can be identified as described herein. In alternative embodiments, a downhole energy source (e.g., a battery) may be used to drive current to electrodes 102 and/or to components of the casing string 11A to establish an electric field in a target region of the downhole formation 30. As described, an energy saving scheme may be employed to turn on or off the downhole energy source periodically. Further, the output of the downhole energy source may be adjusted based on telemetry signals conveyed by the fiber-optic cable 40 or umbilical 106, or based on measurements collected by downhole sensors. Even if an umbilical 106 with one or more electrical conductors and optical fibers is available and is used to generate an electric field in the downhole formation 30, the EM field sensors may operate passively (without an electrical power source). Alternatively, EM field sensor options with minimal power requirements can be powered from small batteries.

While many of the disclosed EM monitoring options involve sensors deployed external to a casing string, it is possible to perform EM monitoring with sensors inside a casing (e.g., if the sensitivity or signal strength is sufficient). Further, openhole EM monitoring is possible (e.g., using a tool deployed via drilling string, wireline, slickline, or coiled tubing). In different embodiments, monitoring flood fronts, updating a reservoir model, and/or performing a multi-stage test can be based on EM monitoring using any one or a combination of the sensor deployment options described herein.

FIGS. 4A-4C are diagrams showing illustrative optical multiplexing architectures for distributed EM field sensing. In FIG. 4A, a light source 202 emits light in a continuous beam. A circulator 204 directs the light along fiber-optic cable 40. The light travels along the cable 40, interacting with the EM field sensor units 42, before reflecting off the end of the cable 40 and returning to circulator 204 via the EM field sensor units 42. The circulator 204 directs the reflected light to a light detector 208. The light detector 208 separates the measurements associated with the EM field sensor units 42 using frequency multiplexing. As an example, each sensor may affect only a narrow frequency band of the light beam conveyed by the fiber-optic cable 40, where each sensor is designed to affect a different frequency band.

In FIG. 4B, light source 202 emits light in short pulses. Each EM field sensor unit 42 is coupled to the main optical fiber via a splitter 206. The splitters direct a small fraction of the light from the optical fiber to each EM field sensor unit 42, e.g., 1% to 4%. The EM field sensor units 42 interact with the light and reflect it back to the detector 208 via the splitter 206, the fiber-optic cable 40, and the circulator 204. Due to the different travel distances, each pulse of light from source 202 results in a sequence of return pulses, with a first set of pulses arriving from the nearest EM field sensor unit 42, a second set of pulses arriving from the second nearest EM field sensor unit 42, etc. This arrangement enables the detector 208 to separate sensor measurements on a time-multiplexed basis.

The arrangements of FIGS. 4A and 4B are both reflective arrangements in which the light reflects from a fiber termination point. These arrangements can each be converted to a transmissive arrangement in which the termination point is replaced by a return fiber that communicates the light back to the surface. FIG. 4C shows an example of such an arrangement for the configuration of FIG. 4B. A return fiber is coupled to each of the EM field sensor units 42 via a splitter to collect the light from the EM field sensor units 42 and direct it to a light detector 208.

Other multiplexing arrangements are possible. For example, multiple EM field sensor units 42 may be coupled in series on each branch of the arrangements of FIGS. 7B and 7C. As desired, a combination of time-division and frequency-division multiplexing may be used to separate individual sensor measurements.

In different embodiments, production well or monitoring well 8A may be equipped with a permanent array of EM field sensor units 42 distributed along axial, azimuthal and radial directions outside casing string 11A. The EM field sensor units 42 may be positioned inside cement 13 (i.e., cementing occurs after the units 42 are deployed) or at the boundary between the cement 13 and the downhole formation 30. Each EM field sensor unit 42 is either part of or is in the vicinity of a fiber-optic cable 40 that serves as the communication link with earth's surface. EM field sensor units 42 can directly interact with the fiber-optic cable 40 or, in some contemplated embodiments, may produce electrical signals that in turn induce thermal, mechanical (strain), acoustic or electromagnetic effects on an optical fiber. Each fiber-optic cable 40 may be associated with multiple EM field sensor units 42, and each EM field sensor unit 42 may produce a signal in multiple fiber-optic cables. The EM field sensor units 42 can be positioned based on a predetermined pattern, geology considerations, or a random pattern. In any configuration, the position of each EM field sensor unit 42 can often be precisely located by analysis of light signal travel times.

The magnetic or electric field measurements collected using EM field monitoring system configurations, such as those shown in FIGS. 2A-2C and 3, are conveyed to earth's surface for analysis. In some embodiments, electrical circuitry (e.g., signal amplifiers) and conductors may be used to convey collected EM field measurements. In such case, a remote power supply and/or other electronics are needed. Alternatively, collected electric field measurements may be converted to optical signals that are conveyed to earth's surface as described herein. With optical conveyance of the collected measurements, remote power supplies can be omitted resulting in a more permanent EM field monitoring installation downhole.

Returning to FIG. 1, collected magnetic or electric field measurement are received at earth's surface by the surface interface 50. The surface interface 50 may also provide a power supply or signal generator for use with EM field monitoring as described herein. As needed, the surface interface 50 may store, decode, format and/or process the collected EM field measurements. The raw signals or processed signals corresponding to the collected magnetic or electric field measurements may be provided from the surface interface 50 to a computer system 60 for analysis. For example, the computer system 60 may process the collected magnetic or electric field measurements to model the subsurface EM field monitored by the EM field sensor units 42. The monitored EM field can be used, for example, to track position of multiple waterfronts 36 at different azimuthal positions relative a borehole. The position of the waterfronts 36 can be presented to a user via a computer system 60 (e.g., by displaying coordinate positions or by visualization of any flood fronts). In different scenarios, the computer system 60 may direct EM field monitoring operations and/or receive measurements from the EM field sensor units 42. The computer system 60 may also display related information and/or control options to an operator. The interaction of the computer system 60 with the surface interface 50 and/or the EM field sensor units 42 may be automated and/or subject to user-input.

In at least some embodiments, the computer system 60 includes a processing unit 62 that directs EM field monitoring control options and/or results by executing software or instructions obtained from a local or remote non-transitory computer-readable medium 68. The computer system 60 also may include input device(s) 66 (e.g., a keyboard, mouse, touchpad, etc.) and output device(s) 64 (e.g., a monitor, printer, etc.). Such input device(s) 66 and/or output device(s) 64 provide a user interface that enables an operator to interact with EM field monitoring components and/or software executed by the processing unit 62.

In at least some embodiments, computer system 60 processes the results of a multi-stage test that monitors EM field activity using deployed EM field sensors and one or more EM field sources as injection rates of different injection wells are varied. For example, the multi-stage test may involve at least one stage in which all of the plurality of injection wells have a positive injection rate. Further, the multi-stage test may involve at least one stage in which at least one of the plurality of injection wells has a null injection rate. Further, the multi-stage test may involve at least one stage in which only one of the plurality of injections wells has a positive injection rate. In at least some embodiments, results of the multi-stage test are used to update a reservoir model that is stored by the computer system 60 and that may be used to perform simulation and/or time-lapse analysis of flood fronts in the downhole formation 30. As desired, results of the multi-stage test may be compared with dynamic simulation results, and the comparison results may be used to update the reservoir model. During the multi-stage test, a controller adjusts the injection rate of one or more injection wells. Further, the controller may adjust the injection rate of one or more injection wells based on position information of the identified flood fronts. In different embodiments, the computer system 60 may be used as the controller. Alternatively, the computer system 60 may be in communication with the controller.

Figure 5:
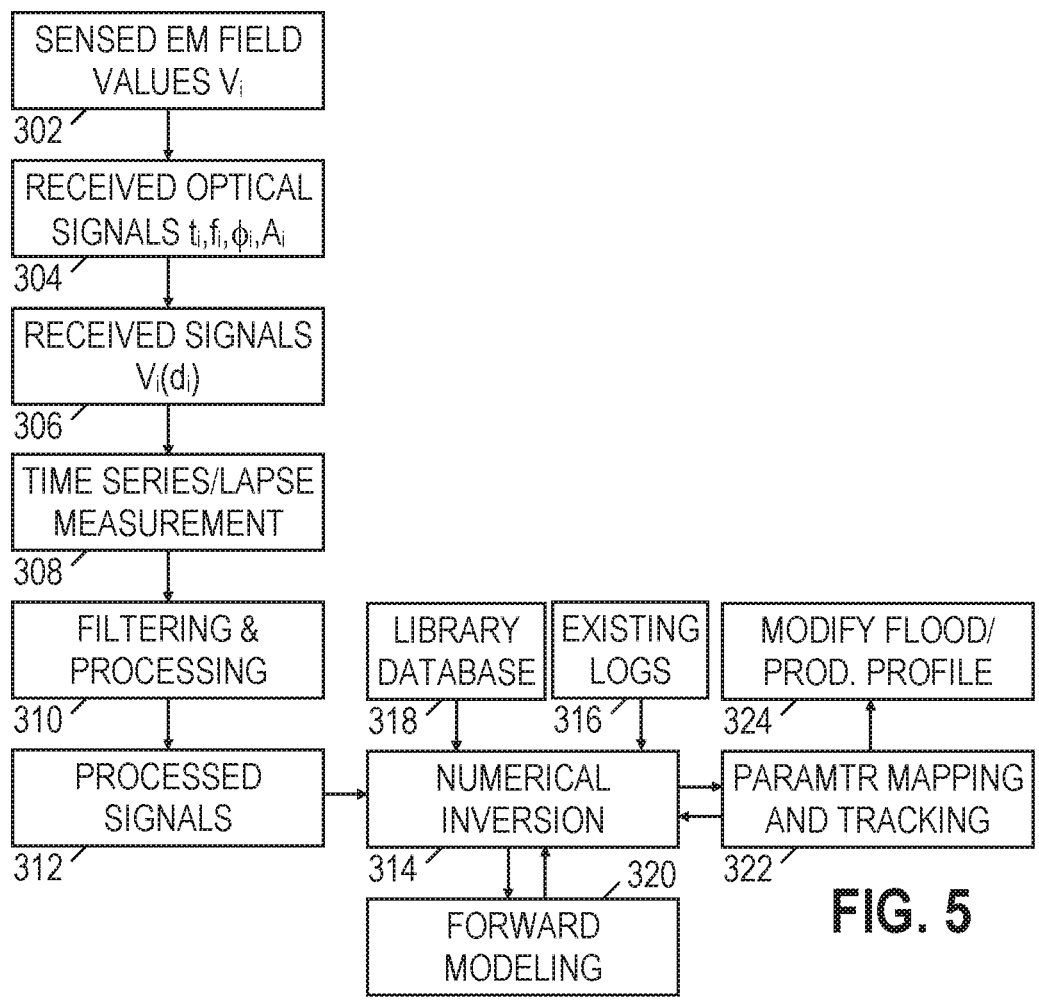
FIG. 5 is a signal flow diagram for an illustrative formation monitoring method.

FIG. 5 is a signal flow diagram for an illustrative formation monitoring method. In different embodiments, a fixed EM field or alternating EM field is provided to a target portion of a downhole formation 30. Example alternating EM fields may have a frequency in the range of 0.1 Hz to 100 kHz. In response to generating a fixed or alternating EM field in the downhole formation 30, measured EM field values ($V_i$, where i is the sensor number) are sensed at block 302 by EM field sensor units 42.

In block 304, the sensed values result in modification of some characteristic of light passing through an optical fiber, e.g., travel time, frequency, phase, amplitude. Alternatively, the sensed values may result in generation of light that is then conveyed to earth's surface via an optical fiber. In block 306, the surface receiver extracts the represented EM field values and associates them with a sensor position $d_i$. The measurements are repeated and collected as a function of time in block 308. In block 310, a data processing system filters and processes the measurements to calibrate them and improve signal to noise ratio. Suitable operations include filtering in time to reduce noise; averaging multiple sensor data to reduce noise; taking the difference or the ratio of multiple EM field values to remove unwanted effects such as a common voltage drift due to temperature; other temperature correction schemes such as a temperature correction table; calibration to known/expected resistivity values from an existing well log; and array processing (software focusing) of the data to achieve different depth of detection or vertical resolution.

In block 312, the processed signals are stored for use as inputs to a numerical inversion process in block 314. Other inputs to the inversion process are existing logs (block 316) such as formation resistivity logs, porosity logs, etc., and a library of calculated signals 318 or a forward model 320 of the system that generates predicted signals in response to model parameters, e.g., a two- or three-dimensional distribution of resistivity. As part of generating the predicted signals, the forward model determines a multidimensional model of the subsurface electric field. All resistivity, electric permittivity (dielectric constant) or magnetic permeability properties of the formation can be measured and modeled as a function of time and frequency. The parameterized model can involve isotropic or anisotropic electrical (resistivity, dielectric, permeability) properties. More complex models can be employed so long as sufficient numbers of sensor types, positions, orientations, and frequencies are employed. The inversion process searches a model parameter space to find the best match between measured signals 312 and generated signals. In at least some embodiments, the best match may be based on a cost function that is defined as a weighted sum of a power of absolute differences between measured signals 312 and generated signals. For example, an L1-norm (power of 1) or L2-norm (power of 2) may be employed. In block 322, the parameters are stored and used as a starting point for iterations at subsequent times.

In different embodiments, the effects of tubing, casing, mud and cement on measurement analysis can be corrected using a priori information on these parameters, or by solving for some or all of them during the inversion process. Since all of these effects are mainly additive and they remain the same in time, a time-lapse measurement can remove them. Multiplicative (scaling) portion of the effects can be removed in the process of calibration to an existing log. All additive, multiplicative and any other non-linear effect can be solved for by including them in the inversion process as a parameter.

The motion of reservoir fluid interfaces can be derived from the parameters and used as the basis for modifying the production profile in block 324. Production from a well is a dynamic process and each production zone's characteristics may change over time. For example, in the case of water flood injection from a second well, water may reach some of the perforations and replace the existing oil production. Since flow of water in formations is not very predictable, stopping the flow before such a breakthrough event requires frequent monitoring of the formations.

Profile parameters such as flow rate/pressure in selected production zones, flow rate/pressure in selected injection zones, and the composition of the injection fluid, can each be varied. For example, injection from a secondary well can be stopped or slowed down when an approaching water flood is detected near the production well. In the production well, production from a set of perforations that produce water or that are predicted to produce water in relatively short time can be stopped or slowed down.

We note here that the time-lapse signal derived from a measured EM field is expected to be proportional to the contrast between formation parameters. Hence, it is possible to enhance the signal created by an approaching flood front by enhancing the electromagnetic contrast of the flood fluid relative to the connate fluid. For example, a high electrical permittivity or conductivity fluid can be used in the injection process in the place of or in conjunction with water. It is also possible to achieve a similar effect by injecting a contrast fluid from the wellbore in which monitoring is taking place, but this time changing the initial condition of the formation.

The disclosed methods and systems may be employed for periodic or continuous time-lapse monitoring of formations including a water flood volume. They may further enable optimization of hydrocarbon production by enabling the operator to track flows associated with each perforation and selectively block water influxes. Precise localization of the sensors is not required during placement since that information can be derived afterwards via the fiber-optic cable. As desired, at least some of a casing string can be employed as an EM field source to decrease system cost compared to employing a separate EM field source downhole.

Figure 6:
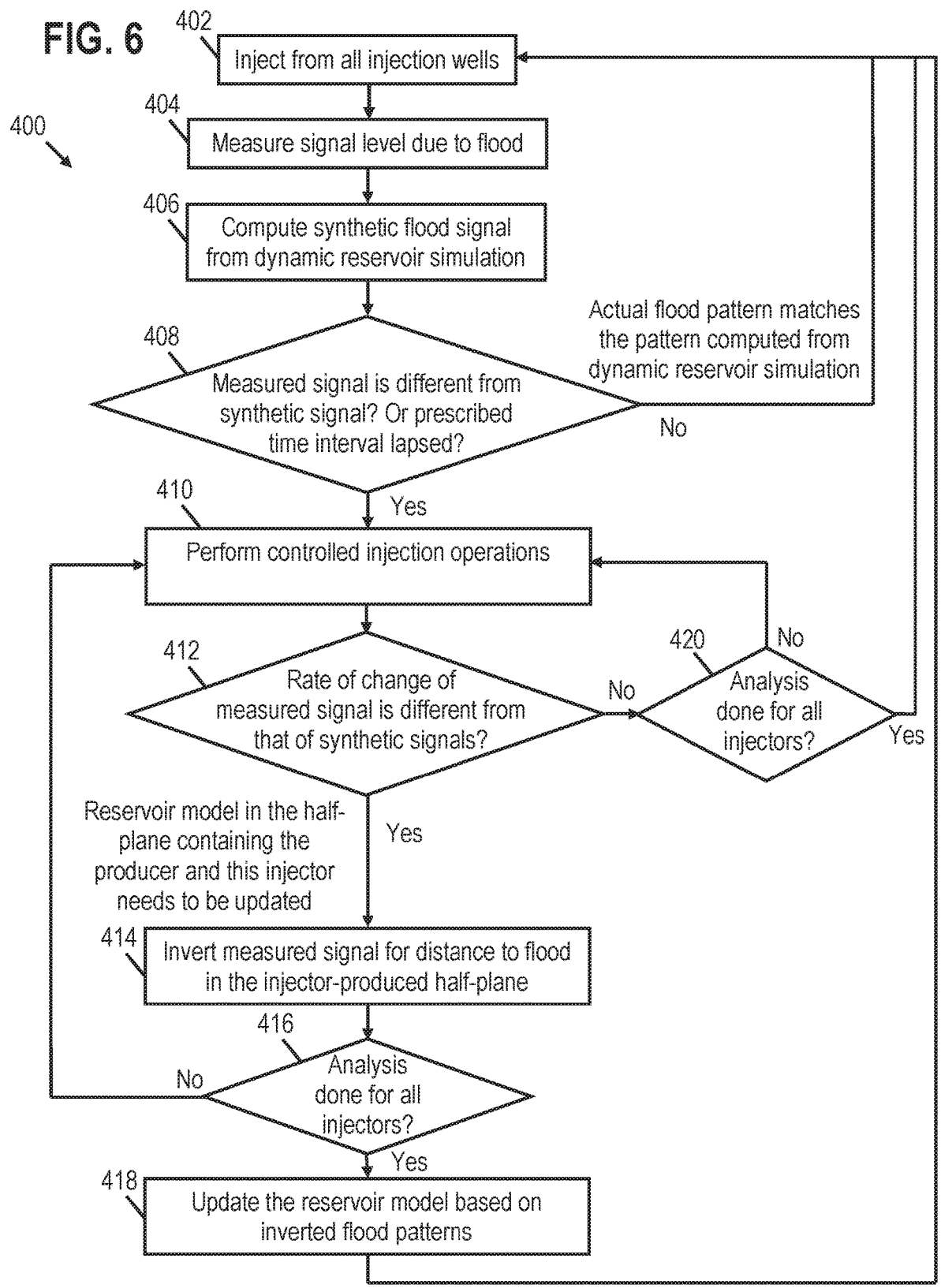
FIG. 6 is a flowchart showing a multi-stage test method to update a reservoir model.

FIG. 6 is a flowchart showing a multi-stage test method 400 to update a reservoir model. At block 402, all injections wells perform injections. Alternatively, a subset of injection wells may perform injections at block 402. At block 404, signal level due to flood is measured. In other words, time-lapse measurements are made as the waterflood front approaches. At block 406 (which may be concurrent with block 404), a synthetic flood signal is computed from dynamic reservoir simulation. For example, the reservoir model may take the injection rates and pressures as inputs, and dynamically update water saturation values of each of the model cells. The dynamic saturation distribution is translated into a dynamic resistivity distribution (using Archie's law for example). The dynamic resistivity distribution is used to compute a synthetic signal response corresponding to the approaching flood (i.e., the synthetic flood signal).

At decision block 408, a determination is made regarding whether the measured signal is different from the synthetic signal, or whether a prescribed time interval has lapsed. If the reservoir model is accurate in describing the waterflood process, the measured and synthetic responses should match. If the determinations of decision block 408 are negative (i.e., the actual flood pattern matches the pattern computed from dynamic reservoir simulation and the prescribed time interval has not lapsed), the method 400 returns to block 402. If either of the determinations of decision block 408 are positive, controlled injection operations are performed at block 410 to identify any mismatch between measured and synthetic responses for individual injection wells. It should be noted that there might be mismatch between the reservoir model and the true Earth model, and yet measured signals still match synthetic ones. This happens when the error in the signal due to a mismatch in the flood pattern from one injection well cancels out the error from another injection well. Therefore, periodic performance of the controlled injection operations may be helpful even if no discrepancy in the signal levels is observed when all injection wells being considered are active.

In at least some embodiments, the controlled injection operations of block 410 involve injecting from one injection well at a time for a prescribed time interval, and computing the rate of change of measured and synthetic responses. The prescribed time interval should be long enough for measurable change in flood front, but not too long to avoid undetected waterflood breakthrough. This time interval can be estimated from reservoir simulation given the prior knowledge of reservoir properties such as rock permeability and porosity, and injection rates. During individual injection intervals, the monitoring system "listens" to changes in the signal due to approaching flood. Any detected signal should be attributed to the active injection well since waterflood from deactivated injection wells is supposed to stop shortly after the injection flow is cut.

At decision block 412, a determination is made regarding whether the rate of change of a measured signal is different from the rate of change of synthetic signals for the injection wells being analyzed. Any discrepancy in the rate of change of measured and synthetic responses indicates that the portion of the reservoir model describing waterflooding from that particular injection well is inaccurate and needs to be updated to match the measurements. If the determination of decision block 412 in negative, the method 400 continues to decision block 420, where a determination is made regarding whether all injection wells have been analyzed. If all injection wells have not been analyzed (decision block 420), the method 400 returns to block 410. If all of injection wells have been analyzed (decision block 420), the method 400 returns to block 402.

If, at decision block 412, the rate of change of a measured signal is determined to be different from the rate of change of synthetic signals for the well being analyzed, the measured signal is inverted for distance to flood in the injector-producer half-plane at block 414. For example, the inversion of block 414 can be constrained to 1-D inversion in the half-plane containing the producer and the active injection well. At decision block 416, a determination is made regarding whether all injection wells have been analyzed. If all injection wells have not been analyzed (decision block 416), the method 400 returns to block 410. If all injection wells have been analyzed (decision block 420), the method 400 proceeds to block 418, where the reservoir model is updated based on inverted flood patterns. For injection wells in which the rate of change of measured response matched that of the synthetic response, no inversion is required, and the resistivity profile is derived from the reservoir model. Besides updating the reservoir model, the results of the multi-stage test method 400 can be used to control the ongoing injection rates of all injection wells.

As desired, the method 400 can be repeated. The results of performing method 400 provide updated resistivity profiles, in all injector-producer half-planes, which can be combined (via interpolation, for example) to obtain a 3-D resistivity distribution. The 3-D resistivity distribution is used to update the reservoir model with saturation distribution (and possibly permeability distribution) derived from the resistivity distribution. The updated saturation distribution serves as initial condition that is plugged back into the dynamic reservoir simulation to model waterflood advancement in the following cycle. Updated reservoir model can be used to optimize injection rates so as to avoid uneven breakthroughs and to optimize the sweep efficiency. In multi-zone wells, different zones can be independently monitored and controlled. For example, if a deviation is detected in a certain zone between measured and synthetic responses, controlled injection process (i.e., the process of activating one injection well at a time) can be applied only within this particular zone without interrupting injection at other zones.

Figure 7B:
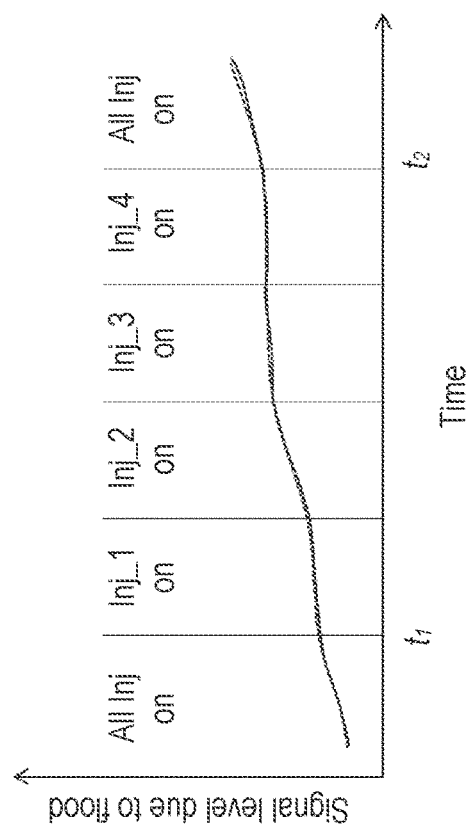
FIGS. 7B and 7C are graphs showing multi-stage test results related to the first waterflooding scenario.
Figure 7C:
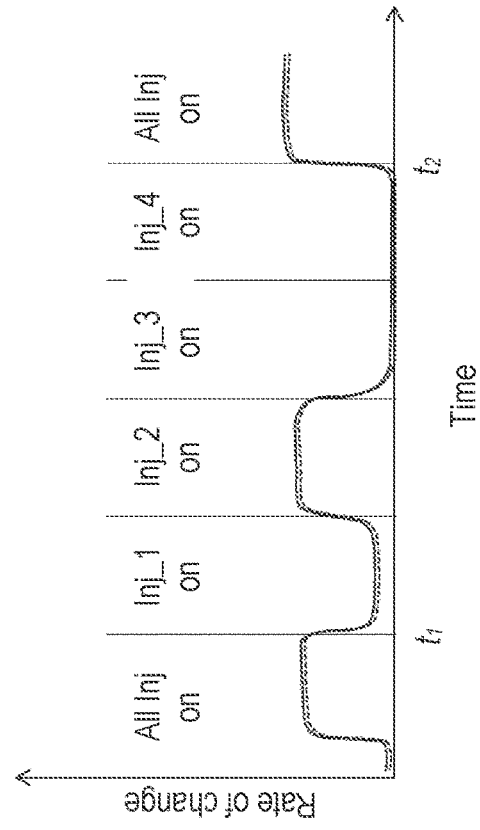
Figure 7A:
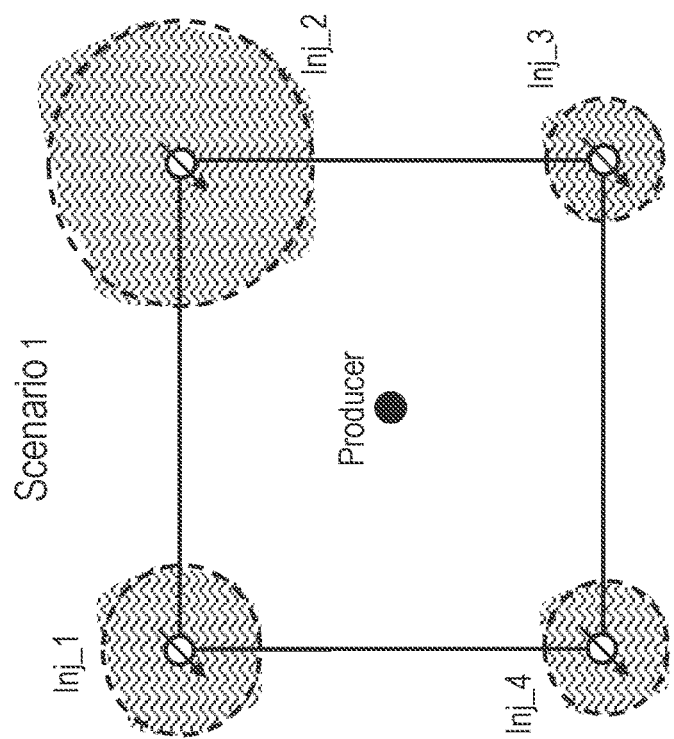
FIG. 7A is a diagram showing a first waterflooding scenario.

FIGS. 7A-7C are diagrams showing a first waterflooding scenario and related multi-stage test results. As shown in FIG. 7A, the first waterflooding scenario corresponds to a producer well surrounded by four injection wells (Inj_1, Inj_2, Inj_3, Inj_4), where the floods related to the different injection wells have different sizes that are modeled correctly (i.e., the dashed line circles representing the modeled floods in FIG. 7A have approximately the same size as the wavy lines representing the actual floods). In FIGS. 7B and 7C, multi-stage test results for the first waterflooding scenario of FIG. 7A are represented, where the measured values for signal levels due to flood and for rate of change match the synthetic response before and during controlled injection operations (triggered at $t_1$). Specifically, the multi-stage test results of FIGS. 7B and 7C indicate that flooding from Inj_2 is responsible for changes to the signal level due to flood. When the reservoir model used for modeling is accurate as is represented in FIGS. 7B and 7C, no corrective action to the reservoir model is needed.

Figure 8B:
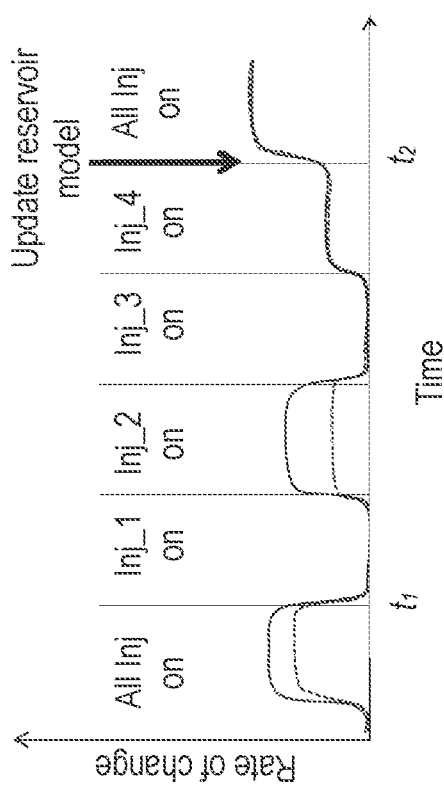
FIGS. 8B and 8C are graphs showing multi-stage test results related to the second waterflooding scenario.
Figure 8C:
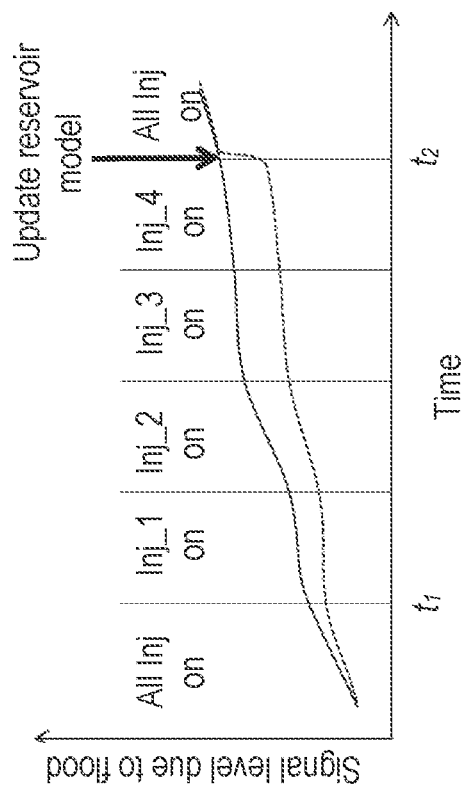
Figure 8A:
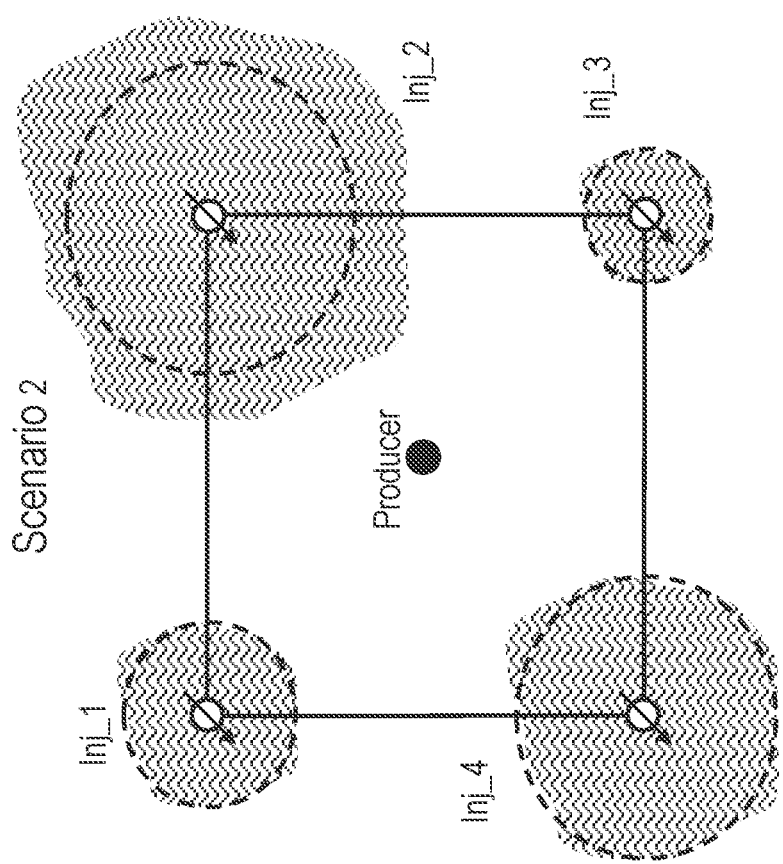
FIG. 8A is a diagram showing a second waterflooding scenario.

FIGS. 8A-8C are diagrams showing a second waterflooding scenario and related multi-stage test results. As shown in FIG. 8A, the second waterflooding scenario corresponds to a producer well surrounded by four injection wells, where one of the floods related to the different injection wells is not modeled accurately (i.e., the dashed line circle representing the modeled flood related to Inj_2 in FIG. 8A is not the same size as the wavy line area representing the respective actual flood). In FIGS. 8B and 8C, multi-stage test results for the second waterflooding scenario of FIG. 8A are represented, where some of the values for signal level due to flood and for rate of change do match the synthetic response. More specifically, the multi-stage test results represented in FIGS. 8B and 8C indicate that the measured and modeled values for the signal level due to flood do not match because of a mismatch in the measured and modeled rate of change values related to Inj_2. Such mismatches can be discovered during controlled injection operations (triggered at $t_1$), where each injection well is operated individually for a time. In the example shown, the rate of change of the measured response while injecting from Inj_2 is higher than the synthetic response values. This indicates that the waterflood front from Inj_2 is closer than estimated by the reservoir model. In response to the mismatch, the measured response is inverted for the resistivity distribution in the half-plane containing the producer and Inj_2, and the resistivity distribution is used to update the reservoir model at $t_2$. Once updated, the measured and modeled values for signal level due to flood and for rate of change are shown to match for all injection wells. As desired, multi-stage testing can be repeated to improve accuracy of the reservoir model over time.

Figure 9A:
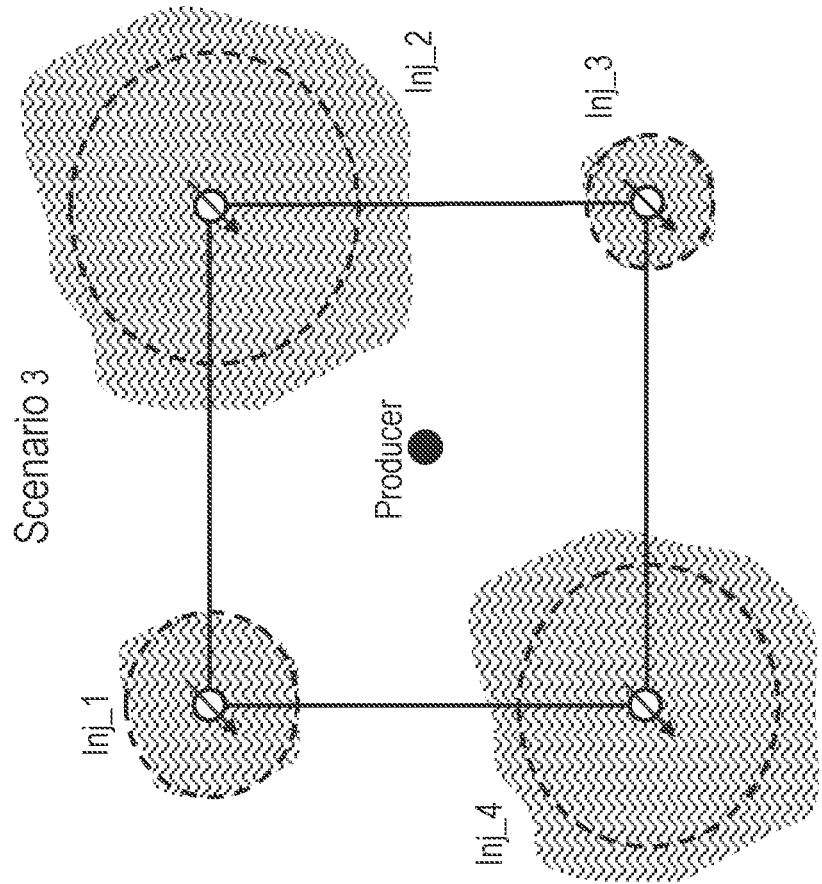
FIG. 9A is a diagram showing a third waterflooding scenario.
Figure 9B:
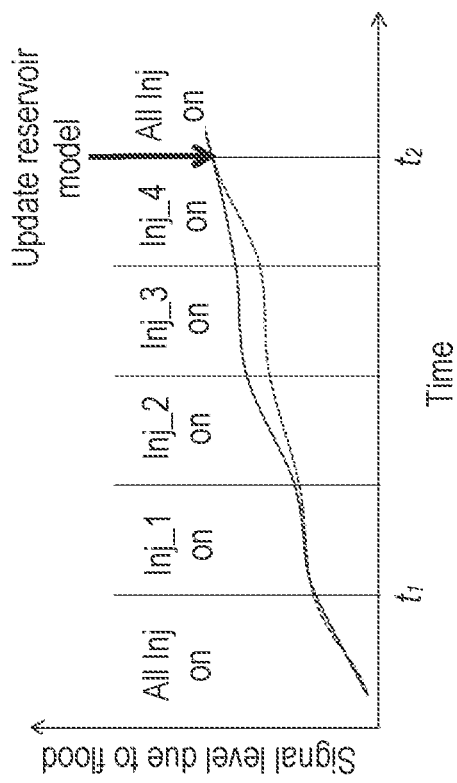
FIGS. 9B and 9C are graphs showing multi-stage test results related to the third waterflooding scenario.
Figure 9C:
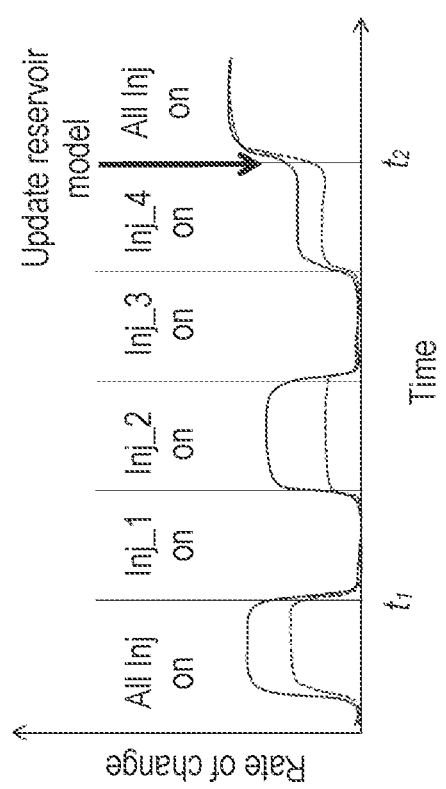

FIGS. 9A-9C are diagrams showing a third waterflooding scenario and related multi-stage test results. As shown in FIG. 9A, the third waterflooding scenario corresponds to a producer well surrounded by four injection wells, where two of the floods related to the different injection wells are not modeled accurately (i.e., the dashed line circles representing the modeled floods related to Inj_2 and Inj_4 in FIG. 9A are not the same size as the wavy line areas representing the respective actual floods). In FIGS. 9B and 9C, multi-stage test results for the third waterflooding scenario of FIG. 9A are represented, where some of the values for signal level due to flood and for rate of change do match the synthetic response. More specifically, the multi-stage test results represented in FIGS. 9B and 9C indicate that the measured and modeled values for the signal level due to flood do not match because of a mismatch in the measured and modeled rate of change values related to Inj_2 and Inj_4. Such mismatches can be discovered during controlled injection operations (triggered at $t_1$), where each injection well is operated individually for a time. In the example shown, the rate of change of the measured responses while injecting from Inj_2 and Inj_4 are higher than the synthetic response values. This indicates that waterflood fronts from Inj_2 and Inj_4 are closer than estimated by the reservoir model. In response to the mismatches, each measured response is inverted for the resistivity distribution in the half-planes containing the producer and Inj_2 and Inj_4, and the resistivity distribution is used to update the reservoir model at $t_2$. Once updated, the measured and modeled values for signal level due to flood and for rate of change are shown to match for all injection wells. As desired, multi-stage testing can be repeated to improve accuracy of the reservoir model over time.

Figure 10A:
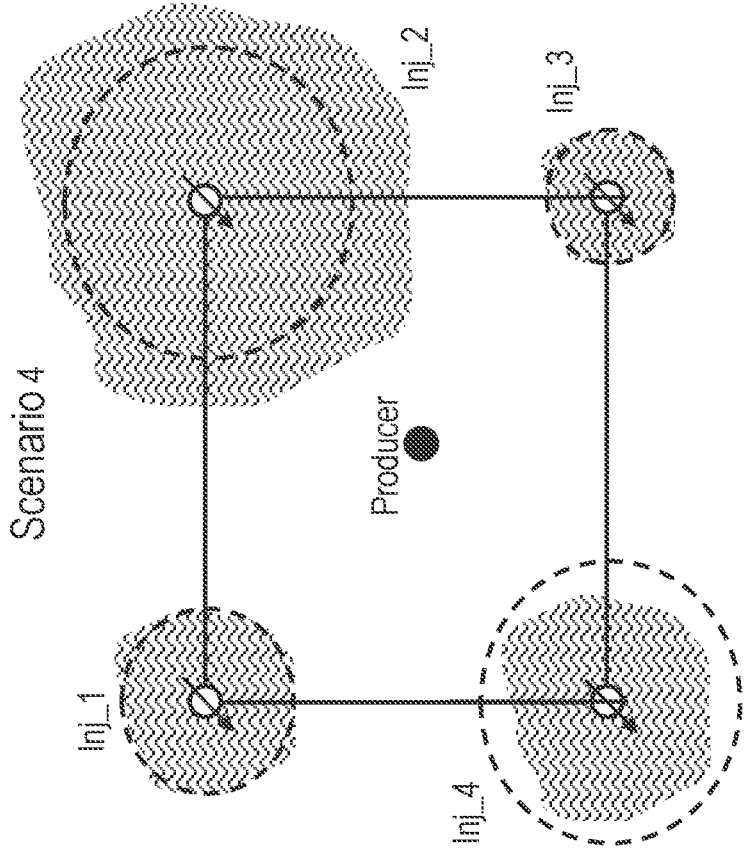
FIG. 10A is a diagram showing a fourth waterflooding scenario.
Figure 10B:
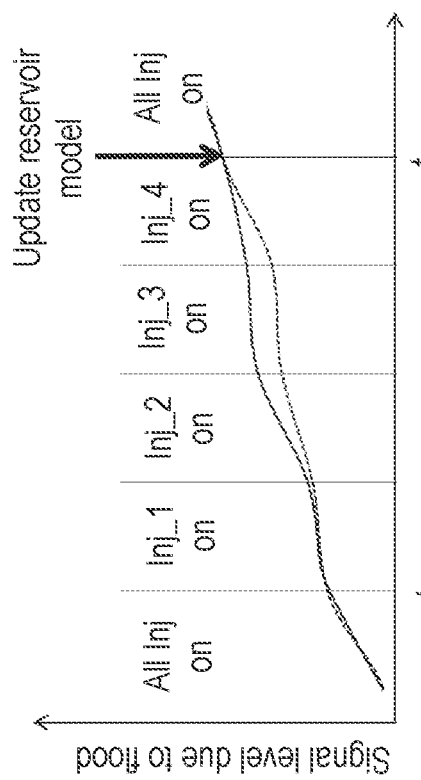
FIGS. 10B and 10C are graphs showing multi-stage test results related to the fourth waterflooding scenario.
Figure 10C:
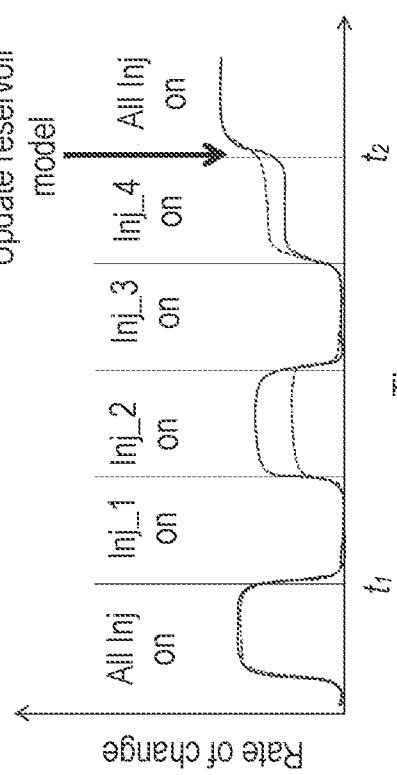

FIGS. 10A-10C are diagrams showing a fourth waterflooding scenario and related multi-stage test results. As shown in FIG. 10A, the fourth waterflooding scenario corresponds to a producer well surrounded by four injection wells, where two of the floods related to the different injection wells are not modeled accurately (i.e., the dashed line circles representing the modeled floods related to Inj_2 and Inj_4 in FIG. 10A are not the same size as the wavy line areas representing the respective actual floods). In FIGS. 10B and 10C, multi-stage test results for the fourth waterflooding scenario of FIG. 10A are represented, where some of the values for signal level due to flood and for rate of change do match the synthetic response. More specifically, the multi-stage test results represented in FIGS. 10B and 10C indicate that the measured and modeled values for the signal level due to flood do not match because of a mismatch in the measured and modeled rate of change values related to Inj_2 and Inj_4. Such mismatches can be discovered during controlled injection operations (triggered at $t_1$), where each injection well is operated individually for a time. In the example shown, the rate of change of the measured responses while injecting from Inj_2 is higher than the synthetic response values. This indicates that waterflood front from Inj_2 is closer than estimated by the reservoir model. In response to the mismatch, the measured response is inverted for the resistivity distribution in the half-plane containing the producer and Inj_2. Meanwhile, the rate of change of the measured responses while injecting from Inj_4 is lower that the synthetic response values. This indicates that waterflood front from Inj_4 is farther than estimated by the reservoir model. In response to the mismatch, the measured response is inverted for the resistivity distribution in the half-plane containing the producer and Inj_4. These resistivity distributions are used to update the reservoir model at $t_2$. Once updated, the measured and modeled values for signal level due to flood and for rate of change are shown to match for all injection wells. As desired, multi-stage testing can be repeated to improve accuracy of the reservoir model over time.

Figure 11:
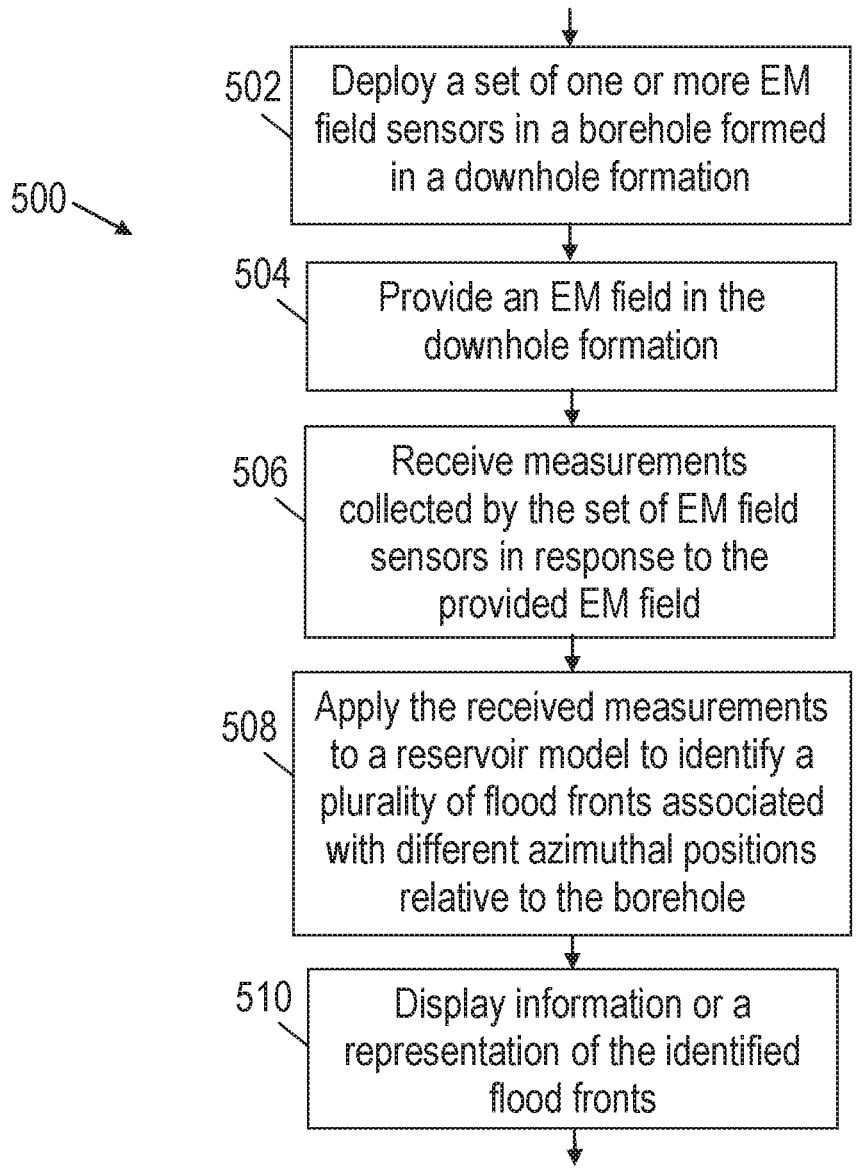
FIG. 11 is a flowchart showing an illustrative method to identify a plurality of flood fronts at different azimuthal positions relative to a borehole.

FIG. 11 is a flowchart showing an illustrative method 500 to identify a plurality of flood fronts at different azimuthal positions relative to a borehole. At block 502, a set of one or more EM field sensors is deployed external to a casing in a borehole formed in a downhole formation. At block 504, an EM field is provided in the downhole formation. At block 506, measurements are received by the set of EM field sensors in response to the provided EM field. At block 508, the received measurements are applied to a reservoir model to identify a plurality of flood fronts associated with different azimuthal positions relative to the borehole. In at least some embodiments, the operations of blocks 504, 506, and 508 include a multi-stage test that monitors EM field activity using the set of EM field sensors as injection rates of a plurality of injection wells associated with the plurality of flood fronts are varied as described herein. The results of the multi-stage test can be used to update the reservoir model employed in block 508, thus improving the accuracy of identified flood fronts. At block 510, information or a representation of the identified flood fronts is displayed. The displayed information can be used by an operator, for example, to adjust the injection rates for a plurality of injection wells. As desired, position information related to the identified flood fronts can be used to control injection operations for a plurality of injection wells with or without user-input.

Embodiments disclosed herein include:

A: A system that comprises a set of one or more EM field sensors deployed in a borehole formed in a downhole formation, wherein the set of EM field sensors provides directional sensitivity to EM fields. The system also includes an EM field source that emits an EM field into the downhole formation. The system also includes a data processing system that receives measurements collected by the set of EM field sensors in response to the emitted EM field, wherein the data processing system applies the received measurements to a reservoir model to identify a plurality of flood fronts at different azimuthal positions relative to the borehole.

B: A method that comprises deploying a set of one or more EM field sensors in a borehole formed in a downhole formation. The method also comprises providing an EM field in the downhole formation. The method also comprises receiving measurements collected by the set of EM field sensors in response to said EM field. The method also comprises applying the received measurements to a reservoir model to identify a plurality of flood fronts at different azimuthal positions relative to the borehole.

Each of the embodiments, A and B, may have one or more of the following additional elements in any combination. Element 1: further comprising a plurality of injection wells associated with the plurality of flood fronts, wherein the plurality of injection wells are used to perform a multi-stage test that monitors EM field activity using the set of EM field sensors and the EM field source as injection rates of different injection wells are varied. Element 2: wherein the multi-stage test involves at least one stage in which all of the plurality of injection wells have a positive injection rate. Element 3: wherein the multi-stage test involves at least one stage in which at least one of the plurality of injection wells has a null injection rate. Element 4: wherein the multi-stage test involves at least one stage in which only one of the plurality of injections wells has a positive injection rate.

Element 5: wherein results of the multi-stage test are used to update the reservoir model. Element 6: wherein results of the multi-stage test are compared with dynamic simulation results, and wherein the comparison results are used to update the reservoir model. Element 7: wherein the set of EM field sensors comprises at least one omni-directional sensor. Element 8: wherein the set of EM field sensors comprises a plurality of sensors that are azimuthally-distributed around the casing. Element 9: further comprising at least one optical fiber to convey the measurements from the set of EM field sensors to earth's surface. Element 10: further comprising a display in communication with the data processing system, wherein the display presents position information or a representation of the identified flood fronts to a user. Element 11: further comprising a controller in communication with the data processing system, wherein the controller adjusts an injection rate of one or more injection wells for ongoing production operations based on position information of the identified flood fronts.

Element 12: further comprising performing a multi-stage test that monitors EM field activity using the set of EM field sensors as injection rates of a plurality of injection wells associated with the plurality of flood fronts are varied. Element 13: wherein the multi-stage test involves at least one stage in which all of the plurality of injection wells have a positive injection rate, and another stage in which at least one of the plurality of injection wells has a null injection rate. Element 14: further comprising updating the reservoir model based on results of the multi-stage test. Element 15: further comprising comparing results of the multi-stage test with dynamic simulation results, and using results of the comparison to update the reservoir model. Element 16: further comprising using at least one optical fiber to convey the measurements from the set of EM field sensors to earth's surface. Element 17: further comprising displaying position information or a representation of the identified flood fronts to a user. Element 18: further comprising adjusting an injection rate of one or more injection wells for ongoing production operations based on position information of the identified flood fronts.

Numerous other variations and modifications will become apparent to those skilled in the art once the above disclosure is fully appreciated. For example, the disclosed sensing configurations can be used in a cross-well tomography scenario, where current is emitted from one well, while EM field sensors are positioned along and collect measurements from one or more other wells. It is intended that the following claims be interpreted to embrace all such variations and modifications where applicable.

What is claimed is:

1. A system that comprises:
   a set of one or more electromagnetic (EM) field sensors deployed in a borehole formed in a downhole formation; and
   a data processing system having instructions executable by the data processing system to,
      vary injection rates of a plurality of injections wells for a multi-stage test that monitors electromagnetic (EM) field activity using the set of one or more EM field sensors,
      receive measurements collected by the set of EM field sensors in response to an EM field provided in the downhole formation, and
      apply received measurements to a reservoir model to identify a plurality of flood fronts corresponding to the plurality of injection wells.

2. The system of claim 1, wherein the multi-stage test involves at least one stage during which all of the plurality of injection wells have a positive injection rate.

3. The system of claim 1, wherein the multi-stage test involves at least one stage during which at least one of the plurality of injection wells has a null injection rate.

4. The system of claim 1, wherein the multi-stage test involves at least one stage during which only one of the plurality of injections wells has a positive injection rate.

5. The system of claim 1, wherein the data processing system further comprises instructions executable by the data processing system to update the reservoir model based, at least in part, on results of the multi-stage test.

6. The system of claim 5, wherein the data processing system further comprises instructions executable by the data processing system to compare results of the multi-stage test with dynamic simulation results, and wherein the instructions executable by the data processing system to update the reservoir model comprises the instructions to update the reservoir model based, at least in part, on the comparison between results of the multi-stage test and the dynamic simulation results.

7. The system according to claim 1, wherein the set of EM field sensors comprises at least one omni-directional sensor.

8. The system according to claim 1, wherein the set of EM field sensors comprises a plurality of sensors that are azimuthally-distributed around the borehole.

9. The system according to claim 1, further comprising at least one optical fiber to convey the measurements from the set of EM field sensors to earth's surface.

10. The system according to claim 1, further comprising a display, wherein the data processing system having instructions executable by the data processing system to display information or a representation of the plurality of flood fronts to a user.

11. The system according to claim 1, further comprising a controller, wherein the data processing system comprises instructions executable by the data processing systems to cause the controller to adjust an injection rate of one or more of the plurality of injection wells based on position information of the plurality of flood fronts.

12. A method that comprises:
    varying injections rates of a plurality of injections wells for a multi-stage test that monitors electromagnetic (EM) field activity using a set of one or more electromagnetic (EM) field sensors deployed in a borehole formed in a downhole formation;
    receiving measurements collected by the set of EM field sensors in response to an EM field provided in the downhole formation; and
    applying the received measurements to a reservoir model to identify a plurality of flood fronts corresponding to the plurality of injection wells.

13. The method of claim 12, wherein the multi-stage test involves at least one stage in which all of the plurality of injection wells have a positive injection rate, and another stage in which at least one of the plurality of injection wells has a null injection rate.

14. The method of claim 12, further comprising updating the reservoir model based on results of the multi-stage test.

15. The method of claim 14, further comprising:
    comparing results of the multi-stage test with dynamic simulation results, and
    updating the reservoir model based, at least in part, on the comparison between the multi-stage test results and the dynamic simulation results.

16. The method according to claim 12, further comprising using at least one optical fiber to convey the measurements collected by the set of EM field sensors to earth's surface.

17. The method according to claim 12, further comprising displaying position information or a representation of the plurality of flood fronts.

18. The method according to claim 12, further comprising adjusting an injection rate of one or more of the plurality of injection wells based on position information of the plurality of flood fronts.

19. The method according to claim 12, further comprising:
comparing received measurements with dynamic simulation results; and
based on the received measurements not matching the dynamic simulation results, performing a second multi-stage test with varying injection rates across the plurality of injection wells.

20. The method of claim 15, wherein updating the reservoir model comprises inverting a resistivity profile in a half-plane that contains the borehole and one of the plurality of injection wells, wherein the comparison between the multi-stage test results and the dynamic simulation results indicates that at least one of the plurality of flood fronts is not correctly identified by the reservoir model.

* * * * *